(12) United States Patent
Park

(10) Patent No.: US 8,506,860 B2
(45) Date of Patent: Aug. 13, 2013

(54) METHOD FOR MANUFACTURING CROSSLINKED FOAM

(76) Inventor: Jang Won Park, Busan (KR)

( * ) Notice: Subject to any disclaimer, the term of this patent is extended or adjusted under 35 U.S.C. 154(b) by 673 days.

(21) Appl. No.: 12/305,937

(22) PCT Filed: Jun. 21, 2007

(86) PCT No.: PCT/KR2007/003015
§ 371 (c)(1),
(2), (4) Date: Jan. 14, 2009

(87) PCT Pub. No.: WO2007/148929
PCT Pub. Date: Dec. 27, 2007

(65) Prior Publication Data
US 2010/0213630 A1    Aug. 26, 2010

(30) Foreign Application Priority Data
Jun. 21, 2006   (KR) .................. 10-2006-0055858

(51) Int. Cl.
*B29C 65/00* (2006.01)

(52) U.S. Cl.
USPC .................................. 264/45.1; 264/46.5

(58) Field of Classification Search
USPC ................ 264/45.1, 46.4, 46.5, 319, 293
See application file for complete search history.

(56) References Cited

U.S. PATENT DOCUMENTS

| | | | | |
|---|---|---|---|---|
| 5,147,589 A | * | 9/1992 | Chang et al. | 264/45.1 |
| 6,670,029 B2 | * | 12/2003 | Norton et al. | 428/308.4 |
| 2004/0261297 A1 | * | 12/2004 | Park | 36/87 |
| 2006/0083912 A1 | * | 4/2006 | Park | 428/304.4 |
| 2006/0125134 A1 | * | 6/2006 | Lin | 264/45.1 |

FOREIGN PATENT DOCUMENTS

| JP | 05337971 A | * 12/1993 |
|---|---|---|
| JP | 8-57985 A | 3/1996 |
| KR | 1999-019616 A | 3/1999 |
| KR | 10-0256180 B1 | 5/2000 |
| KR | 10-2006-0035262 A | 4/2006 |
| KR | 10-0633858 B1 | 10/2006 |

OTHER PUBLICATIONS

English abstract of JP05337971.*
English abstract of JP05337971, 1993.*

* cited by examiner

*Primary Examiner* — Larry Thrower
*Assistant Examiner* — Xue Liu
(74) *Attorney, Agent, or Firm* — Birch, Stewart, Kolasch & Birch, LLP

(57) ABSTRACT

The present invention provides a method of manufacturing foam, including the steps of sealing a mold by providing a lower mold having an arbitrarily-shaped molding surface, and then sequentially placing a middle mold having at least one arbitrarily-shaped protrusion formed on one side thereof or both sides thereof and an upper mold having an arbitrarily-shaped molding surface on the lower mold; simultaneously forming an upper preform and a lower preform, which are prevented from foaming, by charging a foaming material in an inner molding space of each of the upper mold and the lower mold, which are divided by the middle mold; opening the mold and removing the middle mold from the mold; placing an interface material in grooves formed in the preform by the protrusion of the middle mold such that the upper preform and the lower preform are prevented from cross-linking with each other; and simultaneously cross-linking and foaming the upper preform and the lower preform by sealing the mold.

13 Claims, 4 Drawing Sheets

METHOD FOR MANUFACTURING CROSSLINKED FOAM

TECHNICAL FIELD

The present invention relates to a method of manufacturing foam, and, more particularly, to a method of manufacturing foam, which can include at least one arbitrarily-shaped hollow structure therein, or can include an arbitrarily-shaped filling body therein due to the use of a middle mold.

BACKGROUND ART

Generally, foam, which is manufactured using various resin materials and additives, has excellent material properties. Therefore, the use thereof is rapidly expanding. Conventionally, since foam is used for simple uses, such as packaging products, external shock absorption, and the like, it has a single set of material properties because it is manufactured using a single material. However, recently, functional foam, having different material properties or colors for different parts thereof, has been increasingly required. Therefore, various methods of manufacturing such functional foam have been proposed.

Meanwhile, methods of manufacturing foam are roughly divided into a pressure method and an atmospheric method according whether or not a mold is used. In these methods, the pressure method, in which a mold is used, is a method of separately manufacturing foam corresponding to the shape of an inner molding surface of a mold by placing or charging a foaming material into the mold having the arbitrarily-shaped inner molding surface, heating and pressurizing the foaming material placed or charged in the sealed mold under suitable conditions, and then rapidly depressurizing the foaming material heated and pressurized in the sealed mold.

The pressure method is most widely used in the fields of manufacturing foam products for the reason that various foam products can be repeatedly realized according to the shape of the inner molding surface of a mold. However, basically, since the pressure method is characterized in that the external shapes of final foam products are controlled using the inner molding surface of the mold, it is extremely difficult to form a portion having specific material properties into foam products in a desired shape, so that it is impossible to realize functional foam having different material properties for different parts thereof.

In order to solve the above problem, most parties in the related field are adopting a method of manufacturing foam, in which individual intermediate foam products having different material properties or colors are first provided, and then the intermediate foam products are suitably cut and attached to form a desired shape, thereby realizing final foam products having different material properties and colors for different parts thereof. However, this method has a disadvantage in that manufacturing costs are increased because the manufacturing process thereof is complicated, and the defective fraction of products is increased because the processes of cutting and attaching the intermediate foam products are performed by hand.

DISCLOSURE

Technical Problem

Accordingly, the present invention has been made to solve the above problems, and an object of the present invention is to provide a method of manufacturing foam, which has variously-shaped inner structures for different parts thereof, or which has different material properties for different parts thereof, in a single foaming process.

Another object of the present invention is to provide a method of manufacturing foam, in which the inner configuration of the foam can be variously changed even though only a variously-shaped middle mold, rather than a complete mold, is provided.

Technical Solution

In order to accomplish the above objects, an aspect of the present invention provides a method of manufacturing foam, including the steps of providing a lower mold having an arbitrarily-shaped molding surface, and then sequentially placing a middle mold having at least one arbitrarily-shaped protrusion formed on one side thereof or both sides thereof and an upper mold having an arbitrarily-shaped molding surface on the lower mold, thus sealing the molds; simultaneously forming an upper preform and a lower preform by charging a foaming material in inner molding spaces of the upper and lower molds, which are compartmented by the middle mold, under a condition of preventing the foaming material from foaming; opening the molds and removing the middle mold from the upper and lower molds; placing an interface material in grooves formed in the preform by the protrusion of the middle mold such that the upper and lower preforms are prevented from cross-linking with each other; and sealing the molds and simultaneously cross-linking and foaming the upper and lower performs.

Another aspect of the present invention provides a method of manufacturing foam, including the steps of placing a foaming material in an inner molding space of a lower mold having an arbitrarily-shaped molding surface; providing a middle mold having at least one arbitrarily-shaped protrusion formed on one side thereof or both sides thereof and then placing the middle mold on the lower mold; placing a foaming material on the middle mold and then placing an upper mold having an arbitrarily-shaped molding surface on the middle mold, thus sealing the molds; simultaneously forming the foaming materials, which are divided and placed by the middle mold, into an upper preform and a lower preform, respectively, under a condition of preventing the foaming materials from foaming; opening the molds and removing the middle mold from the remaining molds; placing an interface material in grooves formed in the preform by the protrusion of the middle mold such that the upper and lower preforms are prevented from cross-linking with each other; and sealing the molds and simultaneously cross-linking and foaming the upper and lower preforms.

The interface material is characterized in that it is placed in the grooves in a state in which the interface material is covered with a different arbitrarily-shaped preform, which is prevented from foaming, formed of one or more materials selected from among materials the same as or different from the materials constituting the upper and/or lower preforms.

Further, the interface material is characterized in that it is formed of one or more materials selected from among liquid material and solid materials.

The solid material is characterized in that it includes an arbitrarily-shaped molded product.

Further, when the interface material is a solid material, the method may further include the step of removing the interface material after the step of cross-linking and foaming the preforms.

It is characterized in that the middle mold has a plurality of protrusions, and the protrusions are configured to be connected to each other.

ADVANTAGEOUS EFFECTS

As described above, the present invention is advantageous in that foam, which has a variously-shaped inner structure or inner molded foam which has different material properties and includes a variously-shaped molded product therein, can be manufactured in a single foaming process.

DESCRIPTION OF THE ELEMENTS IN THE DRAWINGS

| | |
|---|---|
| 10: | foam |
| 12: | inner structure |
| 14: | molded foam |
| 22: | lower preform |
| 23: | groove |
| 24: | interface |
| 26: | upper preform |
| 30: | interface material |
| 34: | molded product |
| 120, 130: | lower mold |
| 140, 150: | middle mold |
| 160, 170: | upper mold |
| 142, 144: | protrusion |
| 200: | foaming material injection unit |

[Best Mode]

Hereinafter, preferred embodiments of the present invention will be described in detail with reference to the attached drawings. Here, the detailed description of facts irrelevant to the technical ideas of the present invention and obvious facts in the related art will be omitted.

Figure 1:
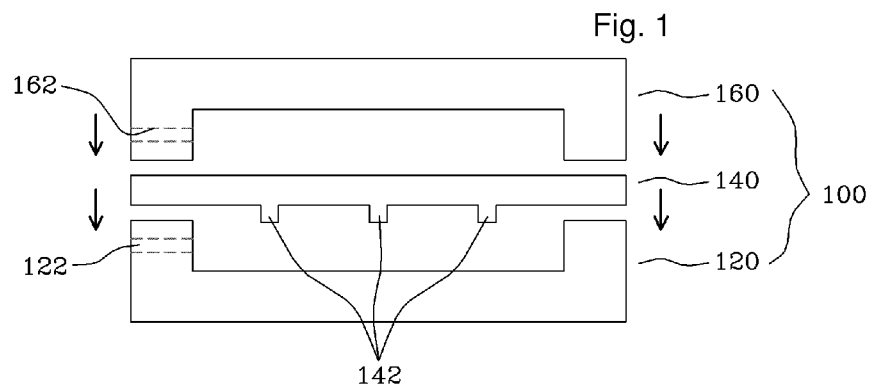
FIGS. 1 to 4 are schematic process views according to an embodiment of the present invention.
Figure 2:
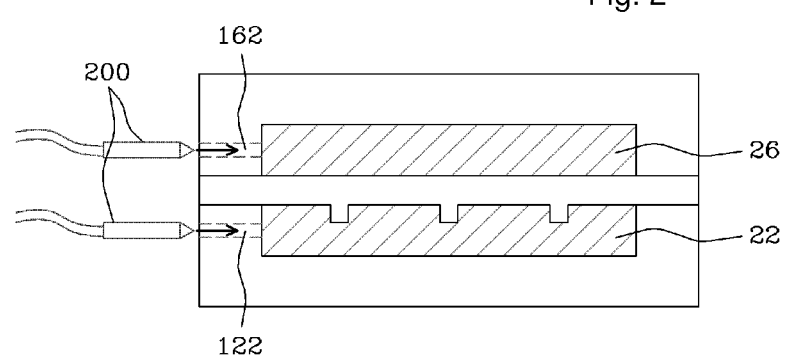
Figure 3:
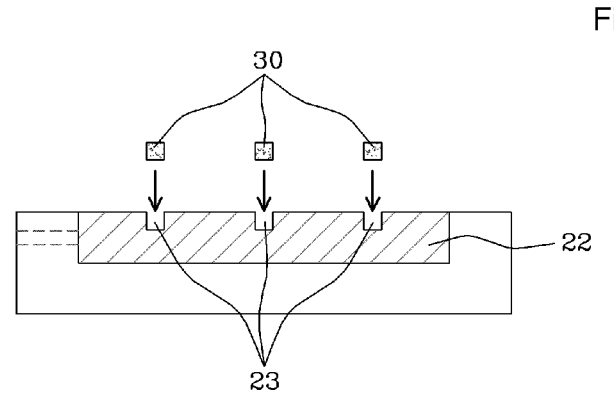
Figure 4:
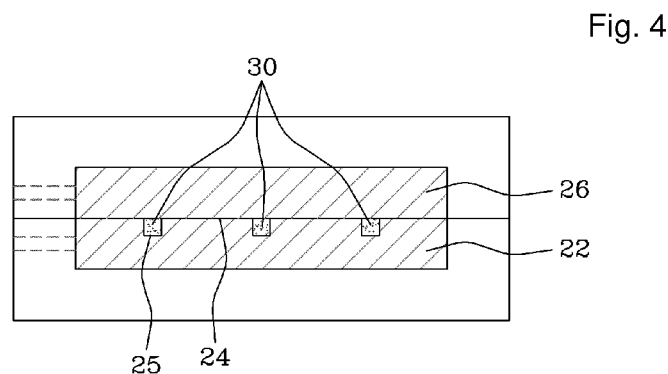

FIGS. 1 to 4 are schematic process views showing a method of manufacturing foam according to an embodiment of the present invention, respectively. In FIGS. 1 to 4, sectional configuration views of constituents necessary for carrying out the present invention are shown, respectively. The method of manufacturing foam according to the present invention may include providing a mold 100, as shown in FIG. 1; forming a preform by charging a foaming material in the mold 100, as shown in FIG. 2; removing a middle mold and placing an interface material, as shown in FIG. 3; and cross-linking and foaming the preform, as shown in FIG. 4.

Figure 8:
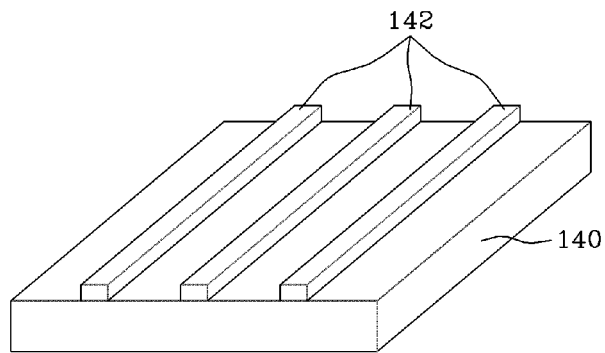
FIGS. 8 and 9 are perspective views showing middle molds according to the present invention.

The mold 100 may include a lower mold 120, an upper mold 160, and a middle mold 140. The lower mold 120 and upper mold 160 may include respective molding surfaces therein. The shapes of the molding surfaces are not particularly limited, and it will be obvious that they may be freely changed depending on the shapes of final foam products to be realized. The middle mold 140 may include protrusions formed on one or both sides thereof. The specific shape of the protrusions is not limited, and may be formed of a plurality of protrusions, and may further be formed by connecting the plurality of protrusions to each other. In FIG. 1, a middle mold 140, on the lower surface of which three protrusions 142 are formed, is shown. In FIG. 8, the specific shape of the middle mold 140 is shown. Meanwhile, in FIG. 9, the structure of the middle mold 140, on which a protrusion 144 is formed by connecting the protrusions to each other, is shown. Reference numerals 122 and 162, which are not described, designate respective foaming material injection pipes.

After a mold 100 is provided, the mold 100 is sealed by sequentially placing a middle mold 140 and an upper mold 160 on a lower mold 120. Subsequently, as shown in FIG. 2, foaming materials are injected and charged into a space formed between the molding surface of the upper mold 160 and the upper surface of the middle mold 140 and a space formed between the lower surface of the middle mold 140 and the molding face of the lower mold 120 using respective external foaming material injection units 200, thereby simultaneously forming an upper preform 26 and a lower preform 22, which are prevented from foaming. The foaming material used in the present invention is not limited as long as it can realize foam.

When the preforms 22 and 26 are formed in a state in which they are prevented from foaming, the mold 100 is open, and then the middle mold 140 is removed from the lower mold 120. When the middle mold 140 is removed therefrom, as shown in FIG. 3, grooves 23 are formed in the lower preform 22 by protrusions 142 of the middle mold 140. It is obvious that the position and shape of the grooves formed on the lower preform 22 are determined depending on the position and shape of the protrusions formed on the middle mold 140.

Figure 9:
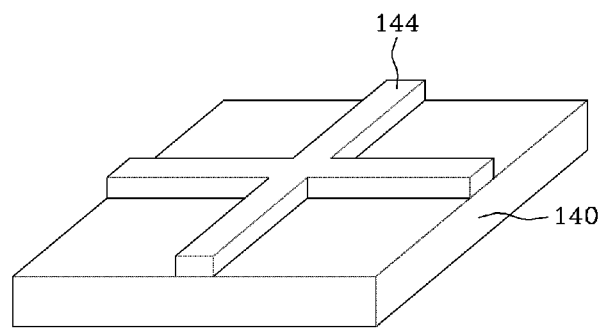

When the grooves 23 are formed on the lower preform 22, interface materials 30 are placed in the grooves 23. The interface material 30 serves to prevent a physical or chemical bond between the preforms which is to adjoin each other through the interface therebetween in a cross-linking and foaming process described below, and may be formed of one or more materials selected from among liquid materials and solid materials. Further, the interface material is not limited with respect to the material properties thereof, as long as it can prevent the physical or chemical bond between the preforms. The shape of the interface material may be configured to have no relation to those of the grooves 23, but, if possible, may be configured to correspond to those of the grooves 23. Further, in the case where the interface material 30 is formed of a solid material, in the present invention, arbitrarily-shaped molded products may be used as the interface material. Here, in the case where the protrusions of the middle mold are configured as shown in FIG. 9, an example of the molded product which can be used as the interface material is represented by reference numeral 34 in FIG. 10.

Figure 11:
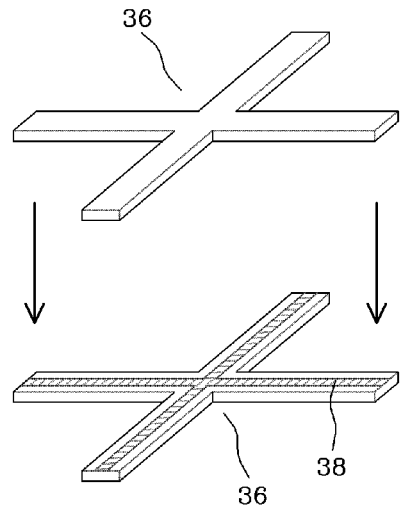
FIG. 11 is a perspective view showing an interface material according to the present invention.

Meanwhile, in the present invention, in the case where the interface materials are placed in the grooves, the interface materials may be placed in the grooves in a state in which they are covered with a different arbitrarily-shaped preform which is formed of one or more materials selected from among materials of the same kind as or different kind from foaming materials constituting respective preforms and is prevented from foaming. Here, in the case where the protrusions of the middle mold are configured as shown in FIG. 9, an example in which the interface material placed in the grooves is used by providing a preform 36 different from the upper preform and the lower preform and then forming an interface material 38 in the preform 36 is shown in FIG. 11.

Figure 12:
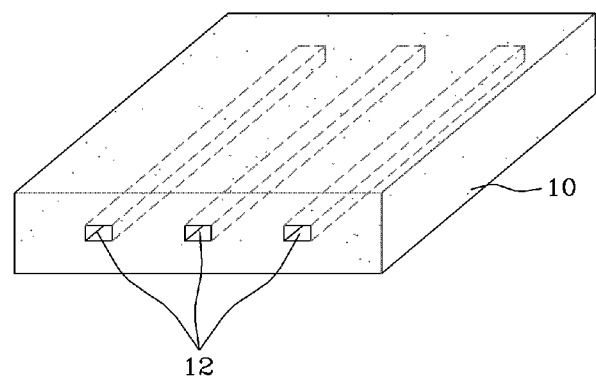
FIGS. 12 to 16 are perspective views showing various foams manufactured according to the present invention.

When the interface materials 30 are placed in the grooves 23 formed in the lower preform 22, as shown in FIG. 4, the upper mold 160, including the upper preform 26, is placed on the lower mold 120, and then a mold 100 is sealed and heated, thereby simultaneously cross-linking and foaming the upper preform 26 and the lower preform 22. In this case, when the sealed mold 100 is heated, the interface 24 between the upper preform 26 and the lower preform 22, which are adhered closely to each other, is cross-linked in gel phase and then proceeds to a foaming process, but the portions 25 formed of the interface materials 30 proceeds to a foaming process without being crosslinked. In this state, when the mold is opened and the forming process is performed, since the portions 25 formed of the interface materials 30 are separated in the foaming process, spaces corresponding to the shape of the interface materials are formed in foam. These spaces are inner structures 12 formed in the foam 10 shown in FIG. 12.

Figure 13:
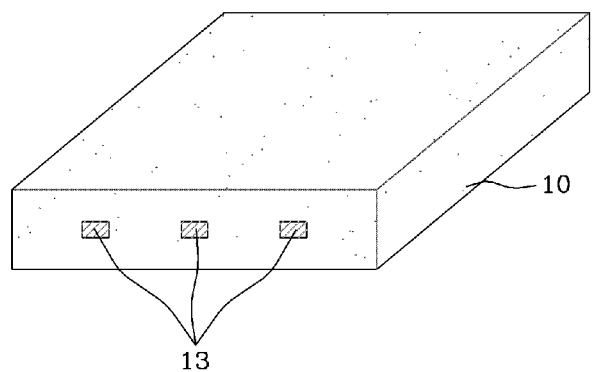

FIG. 13 shows an example in which molded pieces of foam 13 are integrally formed in foam 10 in the case where the interface materials are foamed using materials different from the foaming materials constituting the upper and lower preforms. That is, when materials, having different material properties or colors from the foaming material constituting the upper and lower preforms and having similar foaming properties to those of the upper and lower preforms, are used as the interface materials, molded pieces of foam having different material properties from foam are integrally formed in the foam. If this example is suitably applied, it is possible to manufacture foam including molded pieces of foam having material properties, or material properties and color selected for respective parts of the foam.

Meanwhile, the present invention may further include the step of removing molded pieces of foam, which are the interface materials, after the step of cross-linking and foaming the preforms, in the case where the interface material is solid state and is simultaneously formed in foam as the molded pieces of foam, as this example. That is, foam is manufactured in the form shown in FIG. 13, and the molded pieces of foam 13 are then removed from the foam, thereby obtaining the foam shown in FIG. 12.

Figure 10:
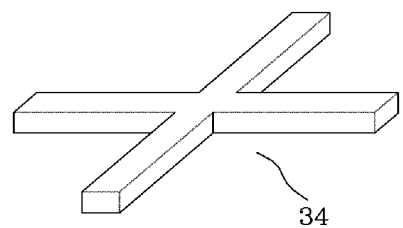
FIG. 10 is a perspective view showing a molded product according to the present invention.
Figure 14:
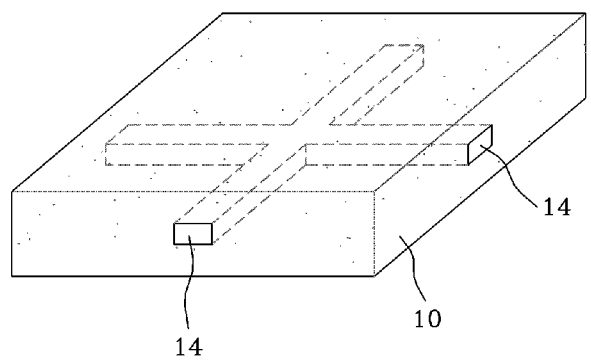
Figure 15:
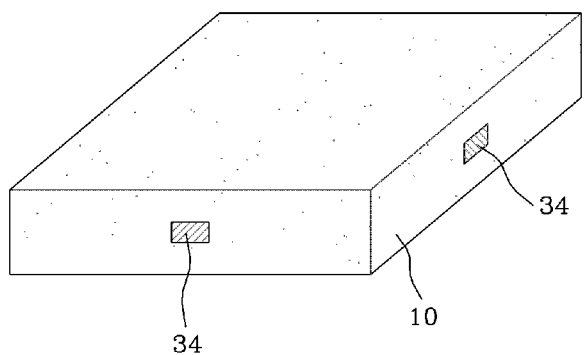
Figure 16:
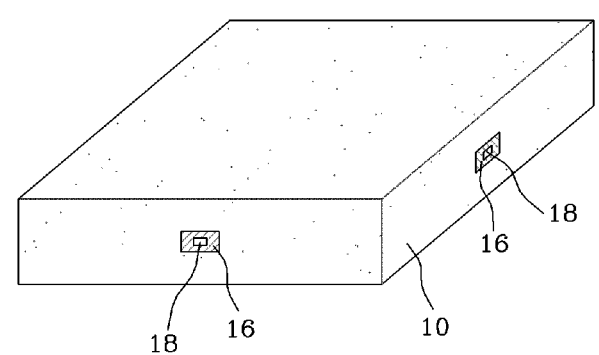

FIG. 14 shows an example of foam manufactured in the case where the protrusions of a middle mold are configured as shown in FIG. 9. As shown in FIG. 14, it can be seen that inner structures 14, represented by reference numeral 14, can be formed in the manufactured foam 10. FIG. 15 shows an example of foam manufactured in the case where the protrusions of a middle mold are configured as shown in FIG. 9 and the molded product shown in FIG. 10 is used as the interface material. As shown in FIG. 15, it can be seen that molded products 34 are integrally formed in the manufactured foam. Further, FIG. 16 shows an example of foam manufactured in the case where the protrusions of a middle mold and the interface materials are configured as shown in FIG. 9 and FIG. 11, respectively. As shown in FIG. 16, it can be seen that molded pieces of foam 16 and inner structures 18 are integrally formed in the manufactured foam 10.

Figure 5:
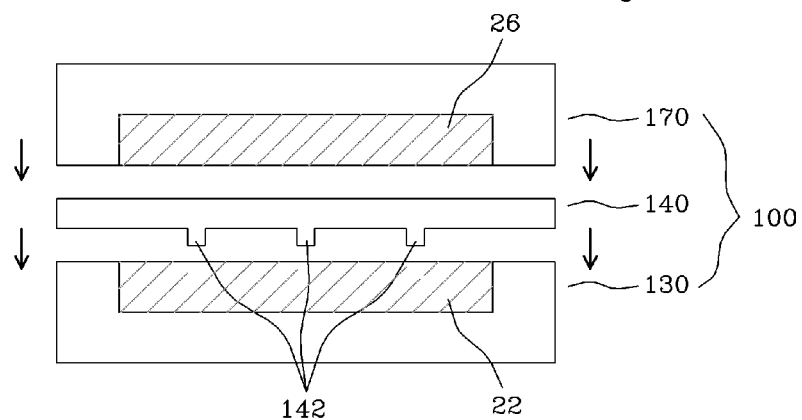
FIGS. 5 to 7 are schematic process views according to another embodiment of the present invention.
Figure 6:
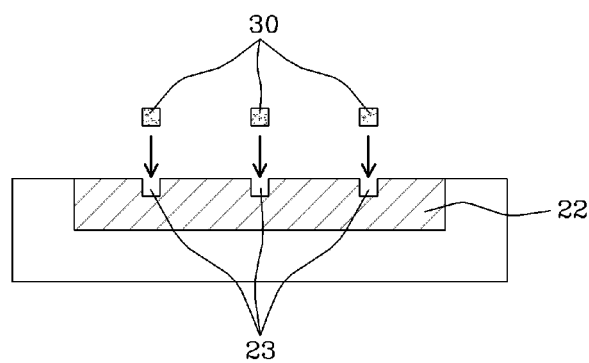
Figure 7:
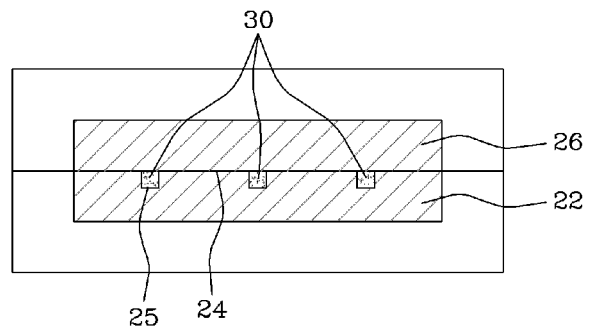

Meanwhile, FIGS. 5 to 7 show a method of manufacturing foam according to another embodiment of the present invention. In FIGS. 5 to 7, sectional configuration views of constituents necessary for carrying out this embodiment of the present invention are shown, respectively. In this embodiment, since the constituents thereof that are the same as those shown in FIGS. 1 to 4 can be described as above, a description of those constituents will be omitted.

First, as shown in FIG. 5, a lower mold 130 having an arbitrarily-shaped molding surface is provided and then a foaming material 22 is placed in an inner molding space formed of the molding surface of the lower mold 130. When the foaming material is placed in the lower mold 130, a middle mold 140 having protrusions 142 is placed on the lower mold 130, a foaming material 26 is placed on the middle mold 140, and then an upper mold 170 having an arbitrarily-shaped molding surface is placed on the middle mold 140, thereby sealing a mold 100.

When the mold 100 is sealed, the foaming materials 22 and 26 are simultaneously formed into respective upper and lower preforms, which are prevented from foaming, by suitably heating the mold 100, and then the middle mold 140 is removed from the mold 100 by opening the mold 100. When the middle mold 140 is removed through a molding process, as shown in FIG. 6, grooves 23 are formed on the lower preform 22 formed in the inner molding space of the lower mold 130 by the protrusions 142 of the middle mold 140. Interface materials 30 are placed in the grooves 23.

When the interface materials 30 are completely placed in the grooves 23 of the lower preform 22, as shown in FIG. 7, the mold 100 is sealed in a state in which the upper preform 26 and the lower preform 22 are closely adhered to each other, and then the upper and lower preforms 26 and 22 are simultaneously cross-linked and foamed by heating the mold 100. If the middle mold and the interface material is suitably selected and then cross-linked and foamed, as shown in FIGS. 12 to 16, various pieces of foam can be realized as described above.

As described above, although the preferred embodiments of the present invention have been disclosed for illustrative purposes, the technical ideas of the present invention are not limited to this description.

The invention claimed is:

1. A method of manufacturing foam, comprising the steps of:
   providing a lower mold having a molding surface, and then sequentially placing a middle mold having at least one protrusion formed on one side or both sides of the middle mold, and an upper mold having a molding surface on the lower mold, thus sealing the molds;
   simultaneously forming an upper preform and a lower preform by charging a foaming material in inner molding spaces of the upper and lower molds, which are compartmented by the middle mold, under a condition of preventing the foaming material from foaming;
   opening the molds and removing the middle mold from the upper and lower molds;
   placing an interface material in at least one groove formed in a surface of at least one of the preforms by the at least one protrusion of the middle mold such that the upper and lower preforms are prevented from cross-linking with each other; and
   sealing the molds and simultaneously cross-linking and foaming the upper and lower preforms.

2. A method of manufacturing foam, comprising the steps of:
   placing a foaming material in an inner molding space of a lower mold having a molding surface;
   providing a middle mold having at least one protrusion formed on one side or both sides of the middle mold and then placing the middle mold on the lower mold;
   placing a foaming material on the middle mold and then placing an upper mold having a molding surface on the middle mold, thus sealing the molds;

simultaneously forming the foaming materials, which are divided and placed by the middle mold, into an upper preform and a lower preform, respectively, under a condition of preventing the foaming materials from foaming;

opening the molds and removing the middle mold from the remaining molds;

placing an interface material in at least one groove formed in a surface of at least one of the preforms by the at least one protrusion of the middle mold such that the upper and lower preforms are prevented from cross-linking with each other; and sealing the molds and simultaneously cross-linking and foaming the upper and lower preforms.

3. The method of manufacturing foam according to any one of claims 1 and 2, wherein the interface material is placed in the at least one groove in a state in which the interface material is covered with a different arbitrarily-shaped preform, which is prevented from foaming, formed of one or more materials selected from among materials the same as or different from the materials constituting the upper and/or lower preforms.

4. The method of manufacturing foam according to any one of claims 1 and 2, wherein the interface material is formed of one or more materials selected from among liquid material and solid materials.

5. The method of manufacturing foam according to claim 4, wherein the solid material includes an arbitrarily-shaped molded product.

6. The method of manufacturing foam according to claim 4, wherein, when the interface material is a solid material, the method further comprises the step of removing the interface material after the step of cross-linking and foaming the preforms.

7. The method of manufacturing foam according to any one of claims 1 and 2, wherein the at least one protrusion formed in the middle mold includes a plurality of protrusions, and the protrusions are configured to be connected to each other.

8. The method of claim 1, further comprising placing the interface material in the at least one groove so that an upper surface of the interface material is coplanar with a top edge of the groove.

9. The method of claim 2, further comprising placing the interface material in the at least one groove so that an upper surface of the interface material is coplanar with a top edge of the groove.

10. The method of manufacturing foam according to claim 1, wherein the at least one groove comprises a plurality of protrusions.

11. The method of manufacturing foam according to claim 2, wherein the at least one groove comprises a plurality of protrusions.

12. The method of manufacturing foam according to claim 1, wherein the middle mold has a first surface conforming to the surface of the molding surface of the upper mold or lower mold, and wherein the at least one protrusion extends from the first surface.

13. The method of manufacturing foam according to claim 2, wherein the middle mold has a first surface conforming to the surface of the molding surface of the upper mold or lower mold, and wherein the at least one protrusion extends from the first surface.

* * * * *